United States Patent [19] [11] 3,893,680
Marcillat et al. [45] July 8, 1975

[54] DEVICES FOR LIMITING TRANSVERSAL LEANING OF VEHICLES

[75] Inventors: Roland Marcillat, Chevannes; Gérard Mantoux, Bois D'Arcy, both of France

[73] Assignee: Ets NICOLAS & Fils, France

[22] Filed: Jan. 21, 1974

[21] Appl. No.: 435,330

[30] Foreign Application Priority Data
Jan. 24, 1973 France .............................. 73.02492

[52] U.S. Cl. .............................. 280/6 H; 280/124 F
[51] Int. Cl. .............................. B60g 19/00
[58] Field of Search ........ 280/6 H, 6.1, 6.11, 124 F; 267/64 R, 64 A, 65 R, 65 D

[56] References Cited
UNITED STATES PATENTS

| 1,990,798 | 2/1935 | Richter | 280/6 H |
| 3,194,579 | 7/1965 | Peras | 280/124 F |
| 3,254,901 | 6/1966 | Fisher | 280/104.5 R |
| 3,610,611 | 10/1971 | Elliott | 280/124 F |
| 3,625,483 | 12/1971 | Stoner | 280/6 H |
| 3,669,409 | 6/1972 | Eranosian | 280/6.1 |
| 3,778,081 | 12/1973 | Takahashi | 280/6 H |

*Primary Examiner*—Philip Goodman
*Assistant Examiner*—John A. Carroll
*Attorney, Agent, or Firm*—Larson, Taylor and Hinds

[57] ABSTRACT

A device for limiting the degree of transversal leaning of a heavy duty wheeled vehicle having two longitudinal side rows of independent wheel axles, each axle having a fluid ram for adjusting the height axis of the vehicle body above the ground. A sensor of the degree of leaning includes a weight member mounted for rotation about an axis parallel to the longitudinal axis of the vehicle and electrical switches symmetrically-positioned for one switch to be operated when the degree of leaning exceeds 3 percent. The switches control solenoid valves for appropriate supply or exhaust of the rams of one row of axles.

6 Claims, 6 Drawing Figures

DEVICES FOR LIMITING TRANSVERSAL LEANING OF VEHICLES

This invention relates to devices for controlling and correcting transversal leaning or tilting of wheeled vehicles and limiting the side inclination of vehicles, suitable for use on road vehicles rolling on a surface presenting a slope transverse to the vehicle. More particularly, the invention relates to such a device which operates automatically so as to limit the magnitude of the leaning to a predetermined value.

There are already known manual and automatic control devices for limiting transversal leaning. In particular, there are known automatically controlled devices for passenger cars provided with a fluid-pressure suspension system. In such a case, the member responsive to leaning consists of a beam or suspended weight, the oscillations of which are dampened by a dash-pot and which directly controls a pressure-regulating valve in the suspension. There is likewise known a device adapted to road-work vehicles, including hydraulic rams mounted such as to control each the distance between one wheel or a wheel assembly and the vehicle body.

Neither of the known devices is entirely satisfactory. More specifically, devices using a control valve directly controlled by a suspended weight require an intricate piping arrangement which may be excessive for heavy-duty vehicles provided with numerous axle lines. On the other hand, such automatic systems have the drawback of starting a correcting action as soon as leaning occurs, thus causing too frequent operations and a high power consumption while this is not indispensable, since a slight amount of leaning is tolerable even if it is permanent.

It is an object of the present invention to provide a device for controlling transverse leaning of a vehicle which is better adapted to practical requirements than the prior art devices.

A leaning-correcting device according to the invention, for a vehicle supported by two longitudinal rows of independent axles, each axle having a single-acting fluid ram for controlling the vertical distance between the axis of the wheels and the vehicle body, comprises a sensor of the degree of leaning including a casing securely connected to the body, a weight member in the casing and rotatable about an axis parallel to the longitudinal axis of the vehicle, cooperating with at least two electrical switches symmetrically-positioned with respect to a vertical line passing through said member axis for operating one of said switches when the degree of leaning exceeds a predetermined value, said switches being arranged in an electrical circuit controlling solenoid values which control supply and exhaust of said fluid to and from the rams in one row at least.

In a particular embodiment of the invention, the movable elements of said switches are associated with resilient means urging the switches to a closed (or open) condition and are subjected to the action of gas jets emitted by nozzles located in the casing, tending to open (or close) the switches, said weight member being constructed and arranged for interrupting one or the other of said jets upon the leaning exceeding said predetermined value in one direction or the other, respectively.

Such fluid controlled switches do not require that an effort be exerted by the weight member for operation thereof while a conventional switch requires such an effort, even if it is associated with a relay. Sensitivity and reliability are thereby improved and it will be appreciated that they are essential to satisfactory operation.

It will be seen that the device is operated only when the degree of leaning reaches a predetermined value, which is selected within the limits of tolerable transverse inclination. Preferably the weight member is associated to damping means which prevent it from oscillating and avoid the operation of the device if the leaning above the limit value is very temporary, for example when the vehicle passes over a hole or shallow trench in the road surface.

The invention will be better understood from the following description of several embodiments thereof, given merely for purpose of illustration. The description refers to the accompanying drawings, in which.

Figures 1, 4:
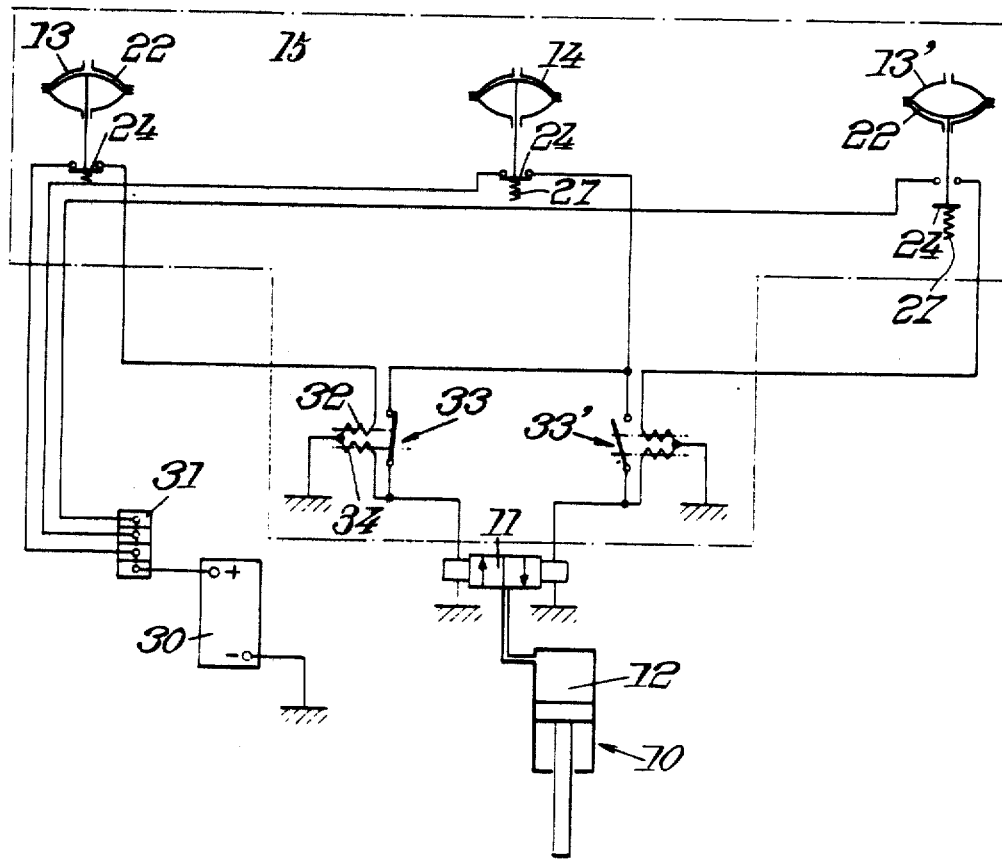
FIG. 1 is a schematic diagram illustrating one of the suspension rams and the associated electric control circuit, including the switches of the sensor.
FIG. 4 is a detail view of one of the electrical switches, in cross-section along line IV—IV of FIG. 3.

Referring to FIG. 1, there is shown a ram or fluid cylinder which is one of the rams in a row of single acting rams each supporting one of the axles or of the bogies of one of the two side rows adapted to support the body of a road vehicle (not shown). The piston of the ram may be connected to the axle or bogie, while the cylinder is connected to the non-suspended portion, with the overall arrangement typically being as disclosed in Spanish utility model n°. 183 443 filed on Aug. 25, 1972 in the name of the assignee of this application. Ram 10, like all the other rams of the same line, is controlled by an electrovalve or solenoid controlled valve 11 which can connect a compartment 12 of the ram either to exhaust or to a supply of pressurized hydraulic fluid, depending on the direction of valve actuation.

Figure 3:
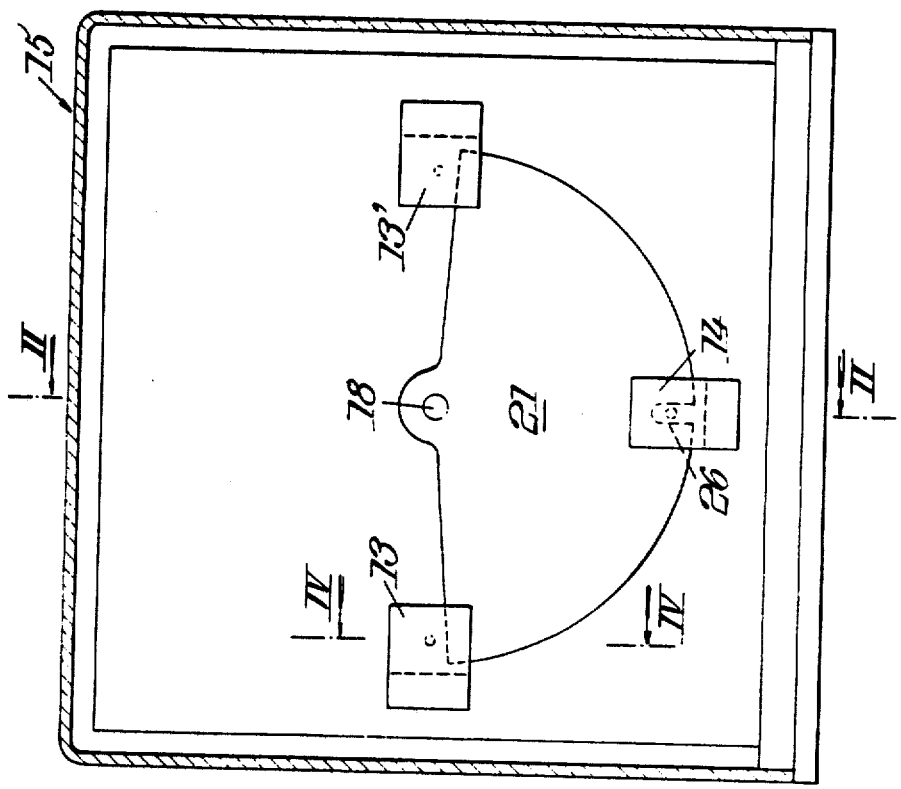
FIG. 3 is a cross-section along line III—III of FIG. 2.
Figure 2:
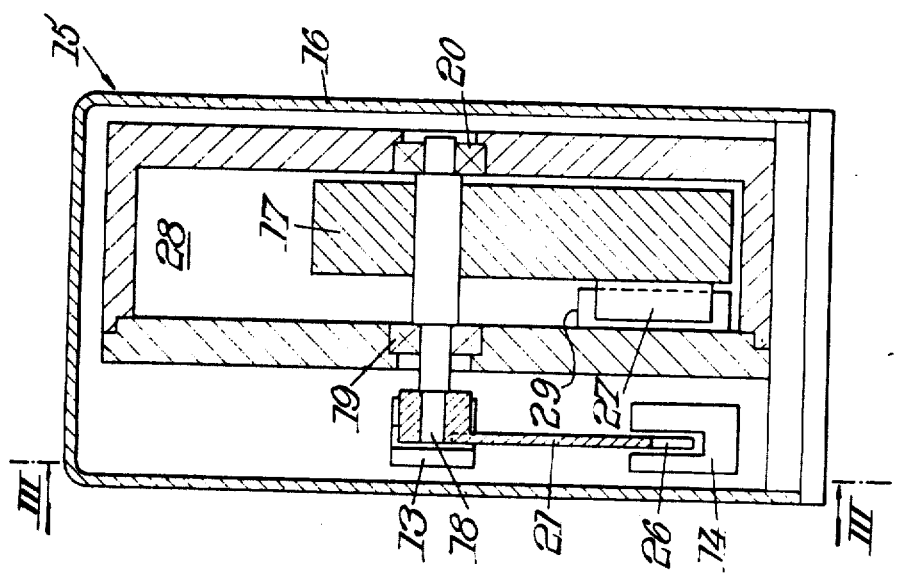
FIG. 2 illustrates a sensor suitable for use in the device shown in FIG. 1, in cross-section along line II—II of FIG. 3.

There is also shown on FIG. 1 three switches 13, 13' and 14 belonging to a sensor 15 of the degree of transversal leaning, the construction of which is schematically illustrated in FIGS. 2, 3 and 4. Sensor 15 comprises a casing 16 secured to the body of the vehicle. In this casing is located a substantially semi-circular weight member 17 carried by a shaft 18. The shaft is rotatable in bearings 19 and 20, secured to the casing, about an axis parallel to the longitudinal axis of the vehicle. A control plate 21 having a semicircular peripheral edge is secured to shaft 18. The weight member 17 and the plate 21 are given a relative position such that in the absence of any leaning, plate 21 is in a position midway between the switches 13 and 13' which are identical. For example, switch 13 (FIG. 4) includes a pressure sensitive capsule having a chamber and a membrane 22 positioned across the chamber. One face of said membrane 22 is abutted by a push pin 23 connected to the movable electrical contact 24 of the switch (FIG. 1). A spring 27 biases the switch and the membrane towards a position in which the movable contact 24 (FIG. 1) connects fixed contacts of the switch. A nozzle 25 mounted opposite the membrane 22 directs towards the latter an air jet for maintaining it in the position shown in FIG. 4 wherein the movable contact is out of engagement with the fixed contacts. When the degree of leaning exceeds a predetermined value (e.g. 3 percent), the extent of movement of plate 21 from the position shown in FIG. 4 is such that it moves into the path of the air jet (as shown in dashed line), whereby the spring moves the membrane and closes the movable contact.

The plate 21 is adapted to cooperate with a third switch 14 which is similar to switches 13 and 13' but is controlled by an air jet which normally flows through a slot 26 in the plate. The slot has a width such that the switch 14 is closed as long as the degree of leaning in either transversal direction is of a magnitude less than a predetermined value, lesser than that which causes switch 13 and 13' to close (e.g. ± 1 percent instead of ± 3 percent). Last, the weight member 17 may be provided with damping means which, in the illustrated embodiment, comprises vanes 27 immersed in oil contained in a closed chamber 28 within the casing end connected to member 17. Stationary vanes 29 associated with the casing and acting as abutments are adapted to limit angular movement of the weight member and contribute to damping thereof. Such means prevents the device from being operated responsive to a very temporary inclination and the member from oscillating.

The switches are mounted in an electrical circuit controlling the electrovalve 11 which may be of the type shown in FIG. 1. Switches 13 and 13' are positioned symmetrically. For example, switch 13 is located in a path which comprises an electric source 30 (e.g. storage batteries), a terminal box 31 (connected to one of the fixed contacts), the control coil 32 (connected to the other fixed contact) of a relay 33 and the mass. The relay contacts 33 are positioned, on the hand, in a circuit which energizes that control winding of valve 11 which causes it to feed the ram 10 (or all rams 10 of the same row) and, on the other hand, in the circuit of the holding winding 34 of relay 33. These circuits are closed by the movable contact of switch 14 when the latter is energized (degree of leaning exceeding 1 percent). Switch 14 is likewise symmetrically mounted in the supply circuit of the holding winding of relay 33' controlled by switch 13' and feeding that control winding of solenoid valve 11 which actuates it in the direction corresponding to the exhaust of ram (or rams) 10. There may be provided one or several solenoid valves controlled by the same leaning sensor.

Since the operation of the device will be obvious upon reading the foregoing description, it will be only briefly outlined. Assuming the body of the vehicle is initially level, all three switches 13, 13' and 14' are open. If the body leans and if the degree of leaning does reach 1 percent, switch 14 closes. However the circuits in which switch 14 is positioned remain open since the movable contact of relays 33 and 33' is clear of the fixed contacts. If leaning increases and exceeds 3 percent to the left, switch 13 also closes and the device will then act to decrease the leaning not merely below 3 percent, but to 1 percent.

The situation is then as illustrated in FIG. 1. The electric circuit comprising the storage batteries 30, the terminal box 31, the switch 13 and the control winding 32 of relay 33 is closed through the mass. The movable contact of relay 33 is attracted and closes, on the one hand, the energizing circuit of the solenoid valve 11 and, on the other hand, the holding circuit of relay 33. The rams 10 associated to the axles of the left row will be fed. The body of the vehicle is gradually restored to its initial position. As soon as the leaning is below 3 percent, plate 21 uncovers the nozzle 25 thus resetting the switch 13 in its open position. The control winding 32 of relay 33 is no longer energized, but the holding winding 34 remains energized through relay 33, switch 14 and terminal box 31. Ram 10 is still supplied. The leaning decreases further. As soon as it falls below 1 percent, plate 21 uncovers the nozzle 24 of switch 14 which opens. Since the solenoid valve 11 is no longer energized owing to the opening of relay 33, it is restored in its neutral position and cuts off compartment 12 of the ram or rams 10.

It will still be seen that the device offers the advantage of being operated only when the degree of leaning is sufficiently large to be troublesome, while remaining inactive during the major part of the running, with a very light leaning. Thus the device combines a reduced fatigue and a reduced power consumption with a correcting action almost equivalent to that provided by a system which operates much more frequently.

In the decribed embodiment, the level of the body of the vehicle with respect to ground may change in accordance with the correction of the leaning. In some cases, such a modification may be ojectionable. In particular, the elevation of the center of gravity upon the arrival of piston to its lower position, tends to decrease the stability of the vehicle.

Figure 5:
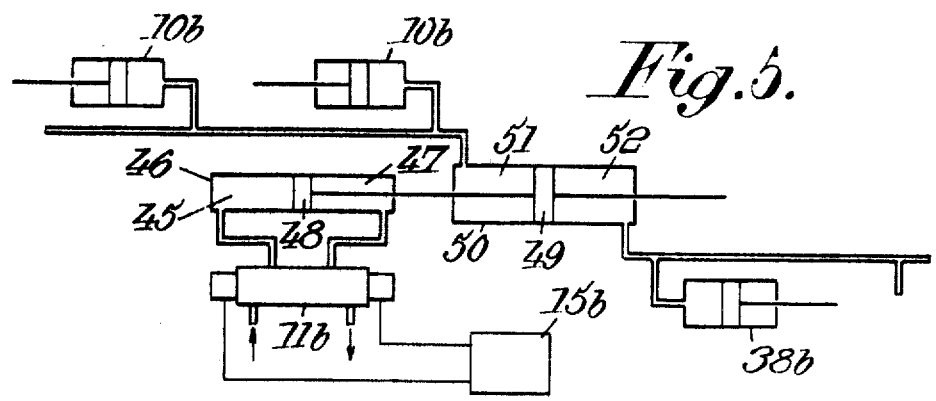
FIG. 5 is a general diagram of a modified device for leaning correction, in which the rams of both lateral rows of axles are symmetrically actuated, said device being usable with a sensor of the type shown in FIGS. 2 to 4.

This drawback is overcome in the embodiment shown in FIG. 5. For more clarity, all parts appearing in FIG. 5 and which are similar to those shown in FIGS. 1–4, bear the same numerals with the index b.

The arrangement diagramatically shown in FIG. 5 comprises a sensor 15b of the degree of leaning, which may be of similar construction as the one shown in FIGS. 2 to 4, and an auxiliary circuit (not shown) enabling the solenoid valve 11b to be controlled in order to bring it into a first position, in which it supplies compartment 45 of a double acting driving cylinder 46 and connects to exhaust the other compartment 45, and a second position in which the fluid connections are reversed. Piston 48 of cylinder 46 is directly connected to the piston 49 of a second cylinder 50 forming a reciprocating pump. One compartment 51 of this double acting pump 50 feeds one lateral row of rams 10b. The other compartments 52 of the pump feeds the other lateral row of rams 38b.

If sensor 15 detects a sufficient degree of leaning, it energizes the solenoid valve 11b. The latter causes displacement of piston 48 of cylinder 46 in the direction corresponding to correction of leaning. Pump 49 discharges then into a row of rams a volume of liquid equal to the volume removed from the other row of rams. Accordingly the average level of the vehicle body does not change.

It is to be noted that cylinder 46 can have transverse dimensions much lower than that of pump 50. Indeed, piston 48 is subjected to the total pressure differential between the supply and the exhaust whereas piston 49 is merely subjected to the pressure differential necessary to overcome the forces due to horizontal offset of the center of gravity of the body with respect to the longitudinal midplane as well as the frictional forces in bearings and the head losses. Obviously, several pumps can be connected to the same cylinder.

Figure 6:
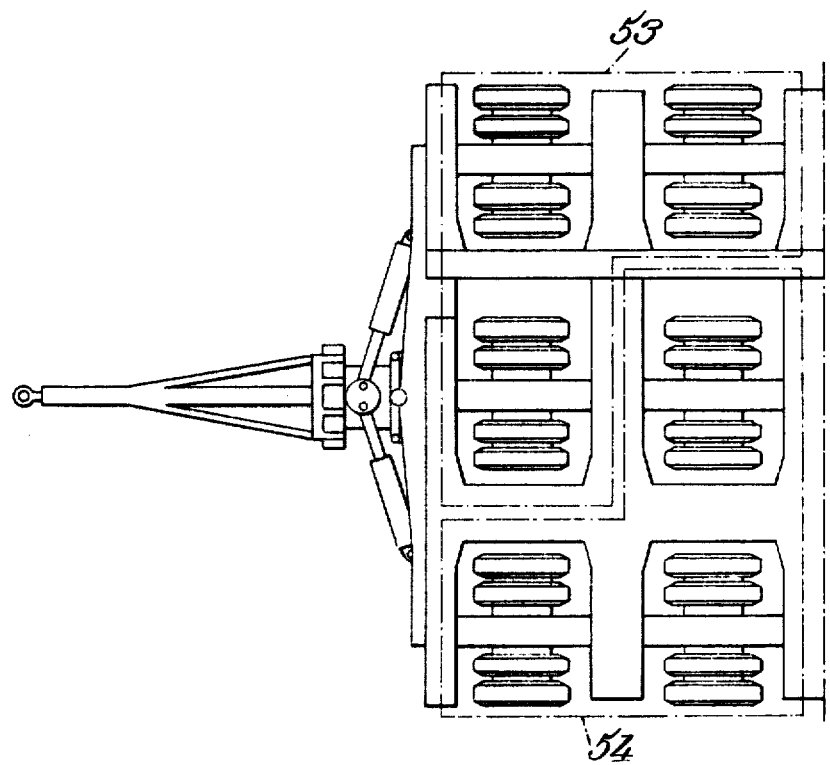
FIG. 6 is a diagrammatic view showing how the axles of a vehicle comprising three rows of independent axles may be associated in a leaning-correcting arrangement.

Up to now it has been assumed for the sake of simplicity that the vehicle comprised only two rows of axles or bogies. However, the system may also be used on a vehicle having more than two longitudinal rows of axles. With three rows of successive axles, the central row can be associated alternately to the axles of one side row and then the axles of the other side row. By way of example, FIG. 6 shows the forward portion of a trailer having three rows of axles, including each two pairs of twin wheels. Each axle is provided with a suspension ram. The rams are interconnected in groups of three, each group including two side axles and one axle from the central line. Two such groups are shown diagrammatically in FIG. 6 by dash-dot frames 53 and 54. In general, there will be provided one solenoid valve per group of three rams, all valves being controlled in parallel. It will also be possible to group the end axles in a single group for them to be analogous to the apex of a triangle and to prevent any redundancy of ground bearing points.

It will be obvious that numeral modifications can be made in the disclosed embodiments. In cases where the longitudinal inclination should be limited, the device can comprise a system similar to the one described but provided with a longitudinal leaning sensor, the weight member of which will oscillate about an axis transverse to the longitudinal mid plane of the vehicle.

We claim:

1. A device for limiting the degree of transversal leaning of a vehicle having two longitudinal side rows of independent axles, each axle having a single-acting fluid ram for adjusting the vertical distance between the axis of the wheels of the axle and the vehicle body, said device comprising a sensor of the degree of leaning including a casing securely connected to the body and a weight member mounted in the casing for rotation about an axis parallel to the longitudinal axis of the vehicle, at least two electrical switches symmetricallypositioned with respect to a vertical line passing through said member axis each for operating one of said switches when the degree of leaning exceeds a predetermined value, said switches being arranged in an electrical circuit controlling solenoid valves which control supply and exhaust of the rams in one row at least, each said sensing switch being provided with means for resiliently urging said switch into one of its closed and open conditions, each switch being subjected to the action of a gas jet delivered by a nozzle carried by the casing, urging the switch into the other of said conditions, said weight member being constructed and arranged such as to interrupt one of said jets upon the degree of leaning exceeding said predetermined value.

2. Device in accordance with claim 1, wherein the leaning sensor controls a solenoid valve which, upon activation thereof, causes fluid to escape from the ram of one row in an amount equal to that of fluid introduced into the rams of the other row.

3. Device in accordance with claim 2, wherein the solenoid valve controls a double acting driving cylinder connected to the piston of a second double acting cylinder formng a pump having one compartment connected to the rams of one row and the other compartment to the rams of the other row.

4. Device in accordance with claim 1, for vehicles having at least one medial line of independent axles, wherein the successive axles of the medial line or lines are connected alternately to corresponding axles of one and the other side lines.

5. A device for limiting the degree of transversal leaning of a vehicle having two longitudinal side rows of independent axles, each axle having a single-acting fluid ram for adjusting the vertical distance between the axis of the wheels of the axle and the vehicle body, said device comprising a sensor of the degree of leaning including a casing securely connected to the body and a weight member mounted in the casing for rotation about an axis parallel to the longitudinal axis of the vehicle, at least two electrical switches symmetrically-positioned with respect to a vertical line passing through said member axis each for operating one of said switches when the degree of leaning exceeds a predetermined value, said switches being arranged in an electrical circuit controlling solenoid valves which control supply and exhaust of the rams in one row at least, wherein the sensor and the circuits are arranged to decrease the degree of leaning, upon exceeding said predetermined value, to a second predetermined value smaller than the first.

6. Device in accordance with claim 5, wherein said sensor includes a third switch which is energized as soon as the degree of leaning exceeds said second predetermined value in either direction, each of the symmetrical switches being positioned in a circuit controlling a supply relay for the solenoid valve whereas the third switch is in a holding circuir of said relays.

* * * * *